United States Patent [19]
Zugibe

[11] Patent Number: 5,377,499
[45] Date of Patent: Jan. 3, 1995

[54] METHOD AND APPARATUS FOR REFRIGERANT RECLAMATION

[75] Inventor: Kevin J. Zugibe, Haverstraw, N.Y.

[73] Assignee: Hudson Technologies, Inc., Hillburn, N.Y.

[21] Appl. No.: 240,444

[22] Filed: May 10, 1994

[51] Int. Cl.⁶ .............................................. F25B 43/04
[52] U.S. Cl. .................................... 62/195; 62/475; 62/292; 62/85
[58] Field of Search .................. 62/77, 85, 149, 195, 62/292, 475

[56] References Cited

U.S. PATENT DOCUMENTS

| | | |
|---|---|---|
| 3,145,543 | 8/1964 | Miner . |
| 4,539,817 | 9/1985 | Staggs . |
| 4,646,527 | 3/1987 | Taylor . |
| 4,766,733 | 8/1988 | Scuderi . |
| 4,856,289 | 8/1989 | Lofland . |
| 5,214,927 | 6/1993 | Squires .................. 62/77 |
| 5,243,832 | 9/1993 | Van Steenburgh . |
| 5,277,033 | 1/1994 | Sanford et al. .............. 62/149 |

Primary Examiner—John M. Sollecito
Attorney, Agent, or Firm—Stanley J. Yavner

[57] ABSTRACT

A method and apparatus for reclaiming refrigerant are described to include a bypass line for hot gas is coupled to a distillation liquid temperature control, which controls the temperature of the system to remain at a very low temperature setting in order to prevent moisture carry-over, and maintain an exact liquid level. The distillation chamber itself contains a heat exchange system and comprises an outlet subsystem for distilled refrigerant, as well as an inlet for contaminated refrigerant. Vapor forms above the liquid in the chamber which is discharged into a compressor, which feeds back hot gases through a helical coil arrangement immersed in the distillation chamber. The compressor alternatively bypasses the helical coil under the control of the temperature controller. In either event, either from the bypass or from the coil a small air cooled dispenser dissipates heat from the compressor work. The system is thus devoid of the usual air or water cooled condensers to condense the refrigerant and/or external electrical heaters.

5 Claims, 1 Drawing Sheet

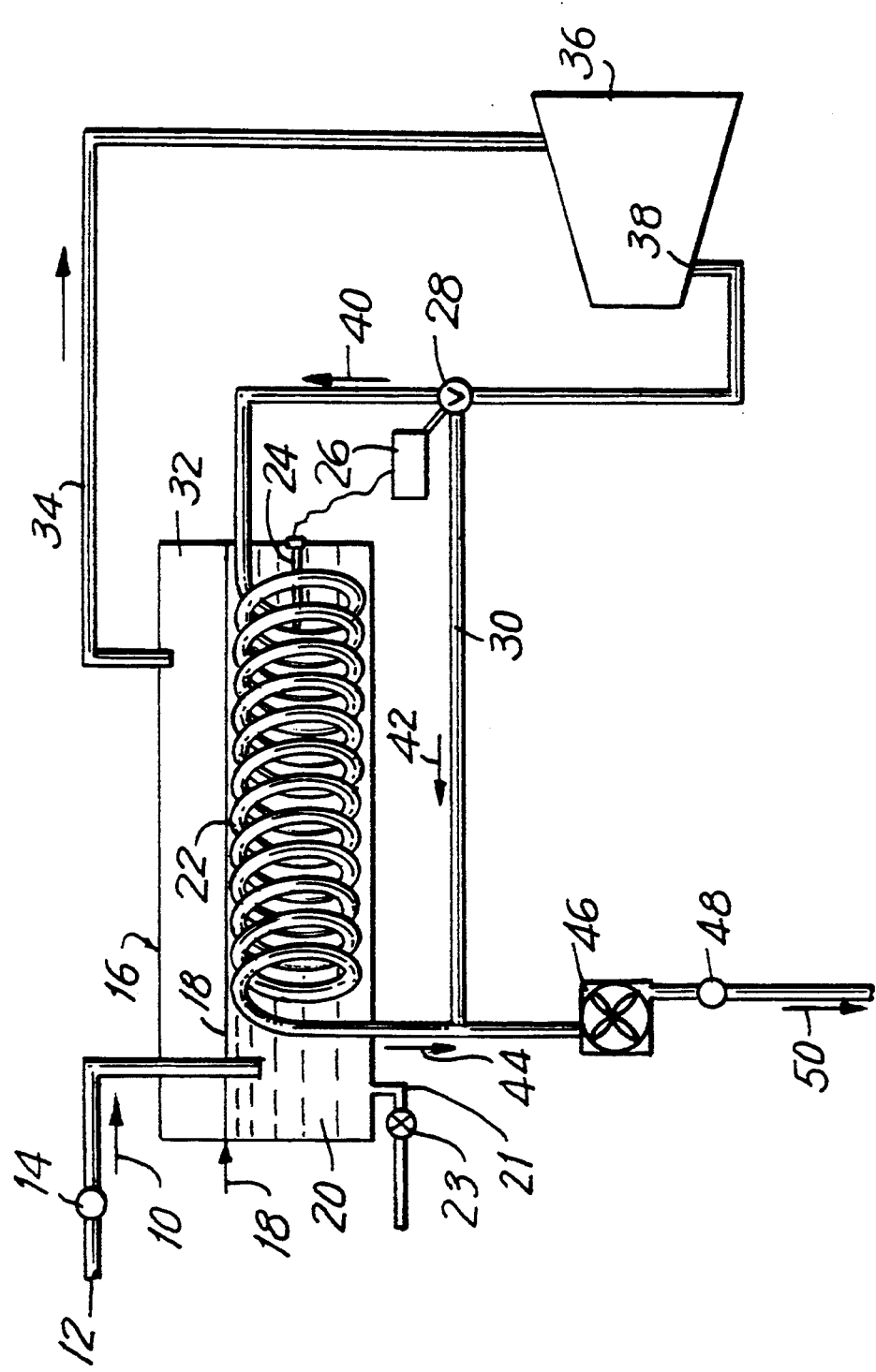

METHOD AND APPARATUS FOR REFRIGERANT RECLAMATION

FIELD OF THE INVENTION

The invention relates primarily to refrigerant reclamation systems and more particularly to such systems without the necessity for cooling water or external electrical heaters.

BACKGROUND OF THE INVENTION

It is customary in systems used for reclaiming refrigerants to include means for water or air-cooled condensers to aid in the process. Normally, because of the usual small size and capacity of reclamation units in the industry today, utility requirements (air, water, heat from external electrical heaters, etc.) are not a particular concern. However, such utility requirements present a definite limitation on how large a unit can be manufactured, considering the practicalities. Speed of refrigerant reclamation is also of particular importance in such systems.

More specifically, in present day refrigerant distillation and reclamation systems, a contaminated refrigerant inlet leads into a distillation chamber, wherein electrical heaters, controlled by an external electrical source and thermostat, are located below the liquid level in the chamber established by the flow of contaminated refrigerant. Of course, a drain for the contaminant is also provided in the chamber. Such heaters cause the contaminated refrigerant to boil and establish a vapor above the liquid level in the chamber. The hot vapor flows into a compresser and then into a water cooled condenser, which outputs distilled refrigerant. The water cooled condenser is operated and controlled by the provision of a water inlet and water outlet for cooling purposes. Thus, water (or air) for cooling and external electrical energy in large quantities is required for vaporing the contaminated refrigerant in these present day systems; and the larger the unit, the more such utilities (water, air, and/or electricity) will be required, leading to a practical limitation on the size of the unit which can be efficiently and practically built.

Examples of such present day systems are disclosed in Taylor U.S. Pat. Nos. 4,646,527, Staggs 4,539,817, Van Steenburgh 5,243,832, Lofland 4,856,289, Scuderi 4,766,733 and Miner 3,145,543. The foregoing represents disclosures of systems which suffer from one or more of the deficiencies and/or limitations pointed out above.

OBJECTS AND SUMMARY OF THE INVENTION

Accordingly, a primary object of the present invention is to provide a distillation system in which external electrical heaters are not required.

A further object of the present invention is to provide a distillation process for reclaiming refrigerant in which air and water cooled condensers for condensing refrigerant are not required.

A still further object of the present invention is to provide a process and apparatus for reclaiming refrigerant, in which the refrigerant vapor is throttled to control the distillation temperature.

These and other objects of the present invention are provided in an apparatus for reclaiming refrigerant, wherein a system for reclaiming refrigerant includes a distillation chamber into which contaminated refrigerant flows and the distillation is accomplished by feeding the vapor above the liquid level in the chamber through a compressor, having an oil separator, and then back through a helical coil structure in the distillation chamber. A temperature control valve selectively divides flow from the compressor between the coil in the distillation chamber and a bypass, depending upon the temperature in the distillation chamber. The bypass temperature control maintains the temperature at a value which prevents moisture carry-over with the distilled refrigerant vapor, and also maintains an exact liquid level in the distillation chamber. The liquid refrigerant level is a function of temperature and pressure, and is critical for control and to prevent liquid slugging of the compressor.

An auxiliary condenser is fed by both the liquid in the coil as well as the bypass flow to remove the compressor heat imparted by the compressor. The condenser produces distilled refrigerant through a pressure regulating valve. Accordingly, the heat of the gas discharge of the compressor provides the heat for distillation in a helical coil in the distillation chamber. The contaminated refrigerant is thus heated by the coil, and produces the vapor above the liquid in the distillation chamber to continuously feed the compressor, which, in turn, continuously feeds hot gas discharge through the helical coil.

BRIEF DESCRIPTION OF THE DRAWINGS

Other objects, features and advantages of the present invention will become apparent by the following detailed description of a preferred, but nonetheless illustrative embodiment, with reference to the accompanying drawing wherein:

The drawing is a schematic diagram of a system including apparatus for performing the method of the present invention.

DETAILED DESCRIPTION OF THE PREFERRED EMBODIMENT

As may be seen from the drawing, the present invention method and apparatus are capable of boiling contaminated refrigerant in a distillation chamber without the need for external electrical heaters. Furthermore, the apparatus and method provide for condensing the compressed refrigerant vapor without cooling water, and can control the distillation temperature by throttling the refrigerant vapor.

The distillation is accomplished by feeding any contaminated refrigerant, represented by directional arrow 10, through an inlet 12 and a pressure regulating valve 14. The contaminated refrigerant flows into distillation chamber, generally designated 16, to establish liquid level 18 of contaminated refrigerant liquid 20. A contaminated liquid drain 21 is also provided, with valve 23. Helical coil 22 is immersed beneath the level 18 of contaminated refrigerant liquid, and thermocouple 24 is placed at or near the center of coil 22 for measuring distillation temperature for purposes of temperature control unit 26. In turn, the temperature control unit controls the position of three-way valve 28, so that the distillation temperature will be set at a constant value at approximately 30 degrees Fahrenheit. Temperature control valve 28 operates in a manner, with bypass conduit 30, so that as vapor is collected in the portion 32 of distillation chamber 16 above liquid level 18 it will feed through conduit 34 to compressor 36. This creates a hot gas discharge at the output 38 of compressor 36, such that those hot gases feed through three-way valve 28, under the control of temperature control 26. In those situations where thermocouple 24 indicates a distillation temperature above thirty degrees Fahrenheit, as an example, bypass conduit 30 will receive some flow of hot gases from compressor 36. Conversely, in those situations where thermocouple 24 indicates a temperature below thirty degrees Fahrenheit, as an example, the flow of hot gases will proceed as indicated by arrow 40 into helical coil 22.

It may also be seen from the drawing and this description, that when thermometer 24 indicates certain values of temperature near thirty degrees Fahrenheit, as an example, hot gases from the compressor will flow partially along the bypass conduit and partially into the helical coil to maintain the thirty degree temperature.

In all situations, all flow through bypass conduit 30 and from helical coil 22, in directions 42, 44, respectively, will pass through auxiliary condenser 46 and pressure regulating valve 48 to produce a distilled refrigerant outlet indicated by directional arrow 50. Alternatively, condenser 46 is controlled by an additional temperature control unit, controlled by the condenser output temperature.

Thus, particularly in cases where there is an extremely large reclamation unit and electrical and water or air requirements would be uneconomical and inefficient to provide, distillation temperature control enables the vapor in the distillation chamber of the present invention to be used for heating of the contaminated liquid, by means of helical coil 22, to produce more vapor and further hot gas output from a compressor to continue the process according to the present invention. External electrical heaters are not necessary and enough condensing of the refrigerant vapor takes place in the distillation chamber of the present invention to require only a small, air-cooled auxiliary condenser 46 to dissipate heat from the work of compressor 36, which includes an oil separator. Air or water cooled condensers to condense the refrigerant are accordingly unnecessary.

By using the apparatus and method of the present invention, refrigerant can be reclaimed at from approximately eighteen to one hundred thousand pounds in an eight hour work day, as distinguished from the prior art capacity of about fifteen hundred pounds per eight hour work day.

The above apparatus provides the process for reclaiming refrigerant in the manner shown and described, but the description is not to be understood as a limitation to the invention, which is to be provided only by the following claims:

What is claimed is:

1. A method for reclaiming refrigerant, comprising the steps of:
   (a) providing contaminated liquid refrigerant into a distillation chamber;
   (b) boiling said liquid refrigerant to cause a vapor to form above said refrigerant in said chamber;
   (c) conducting said vapor to a compressor to form hot gases;
   (d) conducting said hot gases to either a helical coil below the liquid level within said chamber or to bypass said chamber;
   (e) providing a temperature sensor for the liquid within the said chamber and using the sensed temperature to control a valve for choosing flow of said hot gases either to said helical coil or to said bypass; and
   (f) causing flow from said helical coil and said bypass to a condenser for providing an overall output of distilled refrigerant.

2. The invention according to claim 1 wherein an additional step of selectively draining said liquid refrigerant is provided for said method.

3. The invention according to claim 1 wherein said condenser is controlled by an additional temperature control unit, using temperature sensed from the output of said condenser.

4. Apparatus for providing refrigerant reclamation comprising a distillation chamber having both liquid and vapor portions, means for providing liquid to said liquid portion, means for causing vapor in said vapor portion to flow out of the said chamber, a compressor for receiving said vapor and for compressing said vapor, temperature sensing means for liquid in said liquid portion, a temperature control unit whose operation is controlled by said means for sensing temperature, a valve controlled by said temperature control unit, a helical conduit within said chamber for heating said liquid to cause said vapor, a bypass conduit leading from said valve and a condenser for receiving the flow of hot gases from both said helical conduit and said bypass conduit, and for putting out distilled refrigerant.

5. The invention according to claim 4 wherein a liquid drain means is provided for said chamber.

* * * * *